Oct. 8, 1935.   H. TRAMM   2,016,658
CHLORINATION OF HYDROCARBONS
Filed Nov. 9, 1932
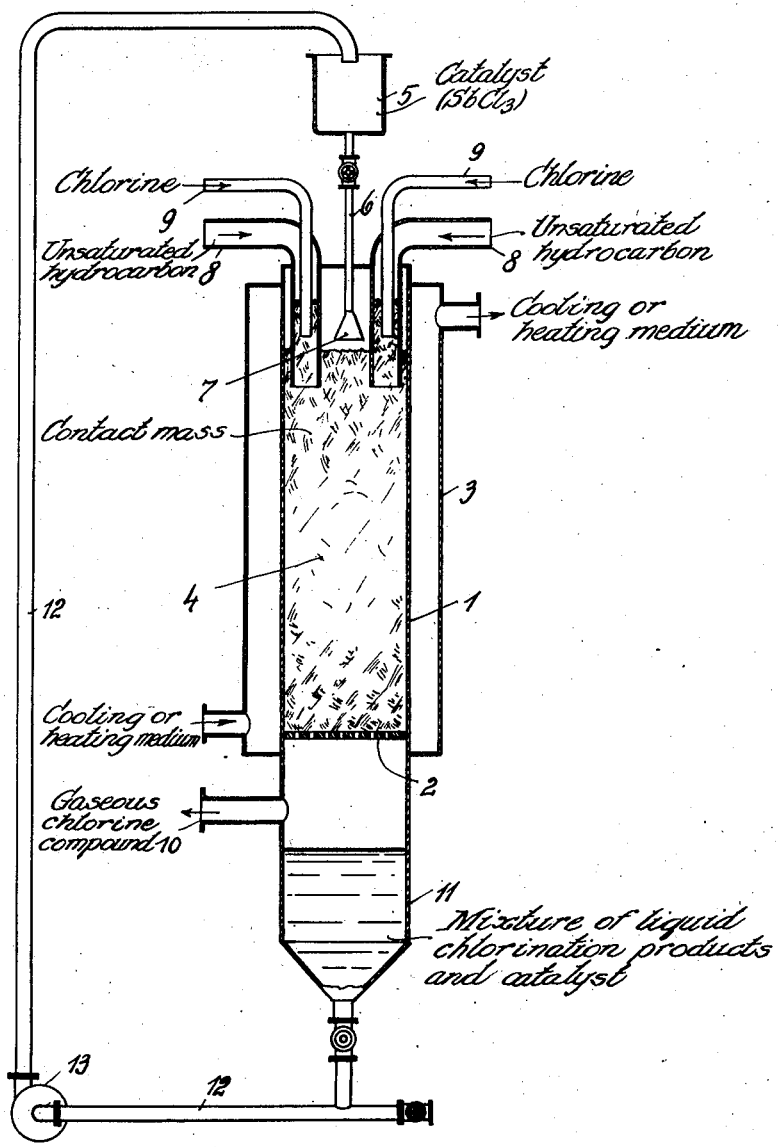
Inventor
Heinrich Tramm:
Atty.

Patented Oct. 8, 1935

2,016,658

UNITED STATES PATENT OFFICE 2,016,658

CHLORINATION OF HYDROCARBONS

Heinrich Tramm, Oberhausen-Holten, Germany, assignor to Ruhrchemie Aktiengesellschaft, Oberhausen-Holten, Germany Application November 9, 1932, Serial No. 641,886
In Germany November 13, 1931

9 Claims. (Cl. 260—166)

My invention relates to the production of chlorine compounds and more especially to derivatives of hydrocarbons, such as for instance tetra-chloro-ethane, dichloro-ethylene and the like.

It is an object of my invention to provide means whereby such chlorinated hydrocarbon products can be produced in a particularly simple and efficient manner.

I have found that catalytic chlorination of the gas mixtures, resulting in the thermic decomposition of methane and other hydrocarbons rich in hydrogen, which mixtures contain besides hydrocarbons richer in carbon, such as acetylene, also large quantities of hydrogen, will yield chlorination products of the hydrocarbons present. Tetra-chloro-ethane, dichloro-ethylene etc. can be obtained by simply acting on these gas mixtures, without it being necessary to first extract the acetylene etc.

Nobody would have thought that a direct recovery of chlorination products of acetylene etc. from a gas mixture containing large quantities of hydrogen would be feasible, since a mixture of hydrogen and chlorine, which is known under the name of chlorine detonating gas, is liable to explode with the greatest vehemence. Therefore, in order to produce tetrachloro-ethane or the like from acetylene, only pure acetylene was used.

I have now found that contrary to all expectations acetylene, to which great quantities of hydrogen are admixed, which may even considerably exceed the percentage of acetylene, can be acted upon and combined with chlorine without the hydrogen being in any way attacked or explosive mixtures of hydrogen and chlorine formed. This discovery is of particular importance in view of the recent developments of methods for converting methane into acetylene by thermic decomposition.

I have found for instance that if a gas mixture containing about 12% acetylene, 40% hydrogen, 20% methane and some carbon monoxide and nitrogen is acted upon at about 200° C. with chlorine in the presence of a catalytically active iron compound, about 90% of the acetylene will be converted into tetrachloro-ethane, while not more than 1 or 2% of the hydrogen present in the mixture are converted into hydrochloric acid.

This surprising result involves the great advantage that the difficulties connected with the extraction of the acetylene from the reaction gases or from other gas mixtures and the subsequent concentration of the acetylene can be dispensed with altogether. According to the present invention the gas mixture resulting in the thermic decomposition of methane under conditions, under which a great percentage of the gas is converted into acetylene, can be mixed directly with chlorine and the mixture passed in contact with a suitable catalyst.

The separation of the chlorine compounds thus formed from the products of the chlorination process can be effected in a very simple manner since in view of their high boiling point mere cooling will cause condensation of these products, which are thus recovered substantially in the liquid phase, while any residual gaseous chlorination products may be recovered from the gas mixture by well known means, such as activated carbon etc.

In practising my invention, I may for instance proceed as follows:—

Example 1

A gas mixture containing 11.6% $C_2H_2$, 1.4% other hydrocarbons, 1.0% oxygen, 5.8% carbon monoxide, 43% hydrogen, 20.4% methane and 16.8% nitrogen is passed together with chlorine through a porcelain tube of 25 mms. inner diameter provided with electrical means for heating a portion of the tube 700 mms. in length. The same portion of the tube is filled with a contact mass consisting of fragments of earthenware impregnated with a concentrated solution of $FeCl_3$. The tube was heated to 150° C. and the gas mixture passed through it at the rate of 100 litres per litre of the reaction space per hour.

The resulting gas mixture had the following composition:

| | |
|---|---|
| $C_2H_2$ | 1.9 |
| $C_nH_m$ | 0.3 |
| $O_2$ | 1.0 |
| $CO$ | 7.8 |
| $H_2$ | 48.0 |
| $CH_4$ | 21.2 |
| $N_2$ | 19.8 |

The reaction space was heated to 150° C.

86% of the acetylene were converted into chlorine compounds, 64.2% of which were tetrachloro-ethane, 35.8% being a mixture of dichloro-ethylene, perchloro-ethylene etc.

These products were recovered from the gases by freezing with the aid of a mixture of $CO_2$ and alcohol and after having been washed with water were subjected to fractional distillation.

Example 2

If operating with the same gas in the same apparatus, the earthenware carrier being however replaced by silicagel and the temperature of reaction and gas velocity being identical with those described with reference to Example 1, 87.6% acetylene were combined with chlorine and 88% of the chlorinated products were found to be tetrachloro-ethane.

When operating with liquid catalysts, such as antimony pentachloride ($SbCl_5$), I made use of an apparatus, such as shown in the drawing affixed to this specification and forming part thereof, the drawing showing a mere diagram by way of example.

In this drawing, 1 is the reaction chamber and 2 is the perforated partition or bottom of this chamber. 3 is a jacket adapted for the introduction of cooling or heating gases or liquids. 4 is the contact mass which fills the reaction chamber proper. 5 is a reservoir and 6 is a pipe suspended from the bottom of this reservoir and ending in a sprinkler head 7 above the contact mass. 8, 8 are bent tubes passing through the cover of the reaction chamber and extending into the top layer of the contact mass, these tubes serving for the introduction of the original gas mixture. 9, 9 are pipes projecting into the tubes 8 and extending into the columns of contact mass filling the lower part of these tubes. 10 is the exhaust port for the gaseous products resulting in the reaction and 11 is a receiver below the reaction chamber which receives the mixture of liquid chlorination products and catalytic agent. 12 is a pipe leading from the bottom of the receiver to the reservoir 5 and 13 is a pump serving to raise the liquid from the receiver 11 to the reservoir.

Example 3

The reaction chamber 1 was filled with silicagel and antimony pentachloride or a mixture of $SbCl_5$ and $C_2H_2Cl_4$ was introduced into the reservoir 5 and allowed to trickle down into the body of silicagel through the sprinkler head 7. Cooling water was conducted through the jacket 3 in order to abduct the heat of reaction. A gas mixture containing 10.8% $C_2H_2$, 1.6% $C_nH_m$, 0.6% $O_2$, 6.0% CO, 48.2% $H_2$, 23.0% $CH_4$ and 9.8% $N_2$ was passed through the tubes 8 into the contact mass 4 at the rate of 216 litres per litre of the contact space per hour. The temperature of the catalyst was about 45 to 50° C. Chlorine was introduced through the pipes 9. In this manner 95% of the acetylene were combined with chlorine and practically all of the chlorinated product was found to be tetrachloro-ethane, which collected in the receiver 11 together with the antimony pentachloride, dripping down from the reaction chamber, the mixture of liquids being conveyed into the reservoir 5 by the pump 13, while the residual gases escaped through the exhaust port 10.

That part of the tetrachloro-ethane and other chlorination products, which was not condensed, was recovered from the residual gases by the action of activated carbon by cooling to a very low temperature or by other means.

Example 4

A gas containing 11.6% $C_2H_2$, 1.6% $C_nH_m$, 0.2% $O_2$, 6.0% CO, 46.2% $H_2$, 22.6% $CH_4$ and 11.8% $N_2$ was passed through the reaction chamber 1 filled with the same catalyst as described with reference to Example 3, the temperature of reaction being about 45° C. and the gas mixture being passed through at the rate of 600 litres per kilogram of the contact mass per hour. 92.5% of the acetylene were found to have been converted into chlorination products 96.5% of which were tetrachloro-ethane. No hydrochloric acid was formed.

These examples show that the chlorination of acetylene, in great dilution and in the presence of great quatities of hydrogen, which was hitherto believed impossible, can be carried through without any risk and with an almost quantitative result.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing chlorine compounds of acetylene, comprising heating a normally gaseous saturated hydrocarbon in such manner as to cause decomposition under formation of a high percentage of hydrogen and appreciable amounts of acetylene, and acting on the gas mixture thus formed with chlorine in the presence of a chlorination catalyst.

2. The method of producing chlorine compounds of acetylene, comprising heating a normally gaseous saturated hydrocarbon in such manner as to cause decomposition under formation of a high percentage of hydrogen and appreciable amounts of acetylene, and acting on the gas mixture thus formed with chlorine in the presence of a catalytically active metal chloride.

3. The method of producing chlorine compounds of acetylene, comprising heating a normally gaseous saturated hydrocarbon in such manner as to cause decomposition under formation of a high percentage of hydrogen and appreciable amounts of acetylene, and acting on the gas mixture thus formed with chlorine in the presence of ferric chloride.

4. The method of producing chlorine compounds of acetylene, comprising heating a normally gaseous saturated hydrocarbon in such manner as to cause decomposition under formation of a high percentage of hydrogen and appreciable amounts of acetylene, and acting on the gas mixture thus formed with chlorine in the presence of ferric chloride distributed on a carrier.

5. The method of producing chlorine compounds of acetylene, comprising heating a normally gaseous saturated hydrocarbon in such manner as to cause decomposition under formation of a high percentage of hydrogen and appreciable amounts of acetylene, and acting on the gas mixture thus formed with chlorine in the presence of ferric chloride distributed on silica gel.

6. The method of producing chlorine compounds of acetylene, comprising heating a normally gaseous saturated hydrocarbon in such manner as to cause decomposition under formation of a high percentage of hydrogen and appreciable amounts of acetylene, and acting on the gas mixture thus formed with chlorine in the presence of antimony pentachloride.

7. The method of producing chlorine compounds of acetylene, comprising heating a normally gaseous saturated hydrocarbon in such manner as to cause decomposition under formation of a high percentage of hydrogen and appreciable amounts of acetylene, and acting on the gas mixture thus formed with chlorine in the presence of antimony pentachloride distributed on a carrier.

8. The method of producing chlorine compounds of acetylene, comprising heating a normally gaseous saturated hydrocarbon in such manner as to cause decomposition under formation of a high percentage of hydrogen and appreciable amounts of acetylene, and acting on the gas mixture thus formed with chlorine in the presence of antimony pentachloride distributed on silica gel.

9. The method of producing chlorine compounds of acetylene comprising passing the gas mixture resulting in the thermic decomposition of methane and containing besides a large quantity of hydrogen a smaller quantity of acetylene, with chlorine in contact with a finely distributed mixture of antimony pentachloride and tetrachloro-ethane.

HEINRICH TRAMM.